INVENTOR
Hitosi Iyoi

BY *Otto John Munz*,

ATTORNEY

Helix angle $\beta$, deg.

United States Patent Office 3,338,110
Patented Aug. 29, 1967

3,338,110
GEAR TRANSMISSIONS AND CAM MECHANISMS WITH A NEW POINT CONTACT SYSTEM OF MESHING
Hitosi Iyoi, 470 Ookubo-machi-1, Narashino, Cheba-ken, Japan
Filed May 19, 1965, Ser. No. 457,062
Claims priority, application Japan, May 28, 1964, 39/29,944
1 Claim. (Cl. 74—462)

ABSTRACT OF THE DISCLOSURE

A gear transmission for transmitting high torques wherein the meshing teeth surfaces of a pair of gears have the following radii, $\bar{a}_1$ and $\bar{a}_2$:

$$\bar{a}_1 = \frac{(r^2/\sin\alpha)(1/R_1 - 1/R_2) \cdot S_1^{1/2}}{[1 + (r/\sin\alpha)(1/R_1 - 1/R_2)]S_1^{1/2} - S_2^{1/2}}$$

$$\bar{a}_2 = \frac{(r^2/\sin\alpha)(1/R_1 - 1/R_2) \cdot S_2^{1/2}}{S_1^{1/2} - [1 + (r/\sin\alpha)(1/R_1 - 1/R_2)]S_2^{1/2}}$$

wherein $$S_1 = (\sin\alpha - r/R_1)^2 + \cos^2\alpha + \cot^2\beta$$
$$S_2 = (\sin\alpha - r/R_2)^2 + \cos^2\alpha + \cot^2\beta$$

and wherein $\alpha$ is the pressure angle, $\beta$ is the helix angle, $r$ is the distance of a contact point from its pitch point, and $R_1$ and $R_2$ are the respective diameters of the pitch circles.

This invention relates to gear transmissions and cam mechanisms with a point system of meshing which are suitable for ordinary use and are especially suitable for high power transmissions.

It is one object of this invention to provide gear transmissions and cam mechanisms which are capable of delivering greater torques under heavier loads than conventional transmission means, thereby providing more dependable accurate power transmission without deformation of transmission components.

It is another object of this invention to provide gear transmissions and cam mechanisms which have a set of radii of curvature of tooth profiles of the two mating tooth surfaces in a plane perpendicular to the instantaneous axis of the moving tooth surfaces which exhibit the maximum contact strength for a particular constant set of contact conditions.

With these and other objects in view, the invention consists of certain novel features of construction, as will be more fully described, and particularly pointed out in the appended claim.

Figure 1:
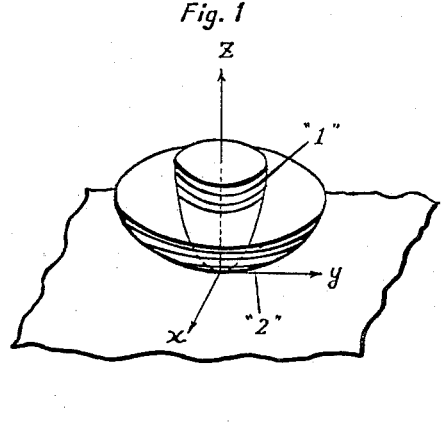
FIG. 1 shows contact behavior of two mating tooth surfaces, 1 and 2, the former, convex and the latter, concave.

Prior to this invention, gear transmissions with a point system of meshing included the Novikov- and Wildhaber-type meshing systems. These systems were subject to certain basic limitations since they were based on the determination of a point system of meshing as one of the modified systems relating to a certain linear system of meshing. The point system of meshing of this invention is not subject to these artificial limitations, being developed using the theory of contacting elastic bodies to determine the most desirable systems among all possible contacts.

The proposed transmissions have a greater contact strength due to the more favorable curvature of the two mating tooth surfaces than any other conventionally found point systems involving Novikov- and Wildhaber-meshings. These transmissions seem to have several times greater load capacity and torque delivery capabilities than any involute meshing hitherto used in transmisison. The transmission of this invention can include gears having parallel, intersecting and crossing axes with both external and internal meshings with fixed transmission ratios. All of these systems can also be used as cam mechanisms.

One of the essential characteristics of Novikov-type meshing is that the profile of the gear tooth is defined by the radius of curvature forming a circumferential arc with a center falling on the point of intersection of the plane under consideration and the instantaneous axis as disclosed in U.S.S.R. Patent No. 109,113. The point system meshing devices of this invention are not subject to such a limitation. Therefore, in the system of this invention there is no ambiguity or confusion in determining the profile of the cooperating gear or cam member.

The tooth profiles of the gear transmissions and cam mechanisms of this invention comprise a series of points, circular arcs, or analogous curves defining the profiles of the mating teeth in a plane perpendicular to the instantaneous axis of movement of the mating components, which plane passes through the contact point of the mating gear or cam components. These profiles are defined by a series of arcs or analogous curves having radii of curvature as expressed by the following equations for gears having parallel axes. The radii are present on a straight line through the contact point and the instantaneous axis.

$$\bar{a}_1 = \frac{(r^2/\sin\alpha)(1/R_1 - 1/R_2) \cdot S_1^{1/2}}{\{1 + (r/\sin\alpha)(1/R_1 - 1/R_2)\} \cdot S_1^{1/2} - S_2^{1/2}}$$

$$\bar{a}_2 = \frac{(r^2/\sin\alpha)(1/R_1 - 1/R_2) \cdot S_2^{1/2}}{S_1^{1/2} - \{1 + (r/\sin\alpha)(1/R_1 - 1/R_2)\} \cdot S_2^{1/2}}$$

wherein $$S_1 = (\sin\alpha - r/R_1)^2 + \cos^2\alpha + \cot^2\beta$$
$$S_2 = (\sin\alpha - r/R_2)^2 + \cos^2\alpha + \cot^2\beta$$

and wherein $\alpha$ is the pressure angle in the transverse section to the axis, $\beta$ is the helix angle, $r$ is the distance of a contact point from its pitch point, and $R_1$ and $R_2$ are the diameters of the pitch circles for the respective gear components.

Gear and cam profiles for elements having crossing axes and intersecting axis can also be expressed by appropriate equations according to this invention.

In order to show the principles embodied in the gear transmissions and cam mechanims of this invention, and to further show how the above equations are applied, some explanation of the derivation of the equations defining the tooth profiles of this invention is hereinafter provided.

In the following description, the formation of two mating tooth surfaces will be explained. In the plane perpendicular to the instantaneous axis and passing through the current position of a contact point, arcs of circumference such as circular arcs or other smooth curves are drawn from centres of curvatures situated on a straight line passing through the current position of the contact point. The curves intersect orthogonally with the instantaneous axis. Then circular arcs or similar curves may serve as tooth profiles. The continuous combination of the profiles obtained for each of the current positions of the contact points provides a profile of the joining tooth surfaces. The working surface of one of the gears will be convex and that of the other will be concave in the direction perpendicular to the instantaneous axis. It is possible for a point system of meshing to arbitrarily determine a set of radii of curvature of tooth profiles at a contact point on a section transverse to the instantaneous axis, provided that (1) the mating surfaces have a common normal in each current position of the contact point, (2) the meshing condition is satisfactorily met by the generalized law of Euler-Savary for meshing with crossing axes, (3) the velocity ratio is constant, (4) the driving action is ensured (for this purpose, helical angle should be of positive value), and finally (5) there is no mutual intersection of the surfaces within the limits of their working sections.

The proposed types of working tooth surfaces satisfy the above conditions and provide the maximum contact strength.

In order to decrease energy losses, which are proportional to the relative sliding velocity, it is necessary that the line of contact points should be properly positioned in relation to the instantaneous axis; and for this purpose an optimum set of radii of curvature of tooth profiles must be sought for at a contact point.

In order to determine the critical values of the radii of curvature, the following mathematical treatment is made. With reference to FIG. 1, when two mating tooth surfaces 1 and 2 be given at a contact point P at which they have a common normal, Cartesian coordinates are introduced. Therein $x$- and $y$-axes are taken on the tangent plane by taking its origin at P and $z$-axis as the common normal; then these surfaces can be represented approximately as follows:

$$z_1 = a_1^* \cdot x^2 + 2h_1^* \cdot x \cdot y + b_1^* \cdot y^2$$
$$z_2 = a_2^* \cdot x^2 + 2h_2^* \cdot x \cdot y + b_2^* \cdot y^2$$

Then, $z_2 - z_1$ can be shown as a normalized form:

$$z_2 - z_1 = A \cdot X^2 + B \cdot Y^2$$

with the conditions:

$$A + B = H_2 - H_1$$
$$A \cdot B = (1/4) \cdot [(K_1 + K_2 - 2k_1 \cdot H_2 - 2k_2 \cdot H_1 + 2k_1 \cdot k_2) \pm \{(k_1^2 - 2k_1 \cdot H_1 + K_1)(k_2^2 - 2k_2 \cdot H_2 + K_2)\}^{1/2}] \quad (1)$$

In order to insure that the tooth surfaces 1 and 2 do not intersect each other at a contact point, the following conditions are applied:

$$z_2 - z_1 > 0 \text{ or } z_2 - z_1 \leq 0, \text{ that is, } A \cdot B \geq 0 \quad (2)$$

For a linear system, $A \cdot B = 0$ holds good along the line of contact points. In Equation 1, $H_1$ and $H_2$ are respective mean curvatures of tooth surfaces 1 and 2 at a contact point; $K_1$ and $K_2$ are geometrical or Gaussian curvatures and finally $k_1$ and $k_2$ are normal curvatures in an arbitrary sectional plane that involves the common normal at a contact point.

In order to provide a maximum contact strength, the contact area of the mating surfaces is maximized under given contact stresses.

The following formula is well known:

$$P_o = (3/2) \cdot P^* / (\pi a \cdot b) \quad (3)$$

wherein $P^*$ is the total loading on the compressed area and $P_o$ is the maximum stress.

$a$ and $b$ are the respective lengths of the semi-major and semi-minor axes of the ellipse as a sectional plane of two mating tooth surfaces expressed by the following equations:

$$a = C_a \cdot [\{(3/4) \cdot P^* / |A+B|\} \cdot (1/ⓔ_1 + 1/ⓔ_2)]^{1/3}$$
$$b = C_b \cdot [\{(3/4) \cdot P^* / |A+B|\} \cdot (1/ⓔ_1 + 1/ⓔ_2)]^{1/3} \quad (4)$$

wherein $$ⓔ_1 = E_1/(1-\nu_1^2) \text{ and } ⓔ_2 = E_2/(1-\nu_2^2)$$

$E_1$ and $E_2$ are the respective Young's modulus; and $\nu_1$ and $\nu_2$ are Poisson's ratios of two mating gears.

$C_a \cdot C_b$ is expressed by a function of ⓔ, defined by the equation:

$$\cos ⓔ = |A-B|/|A+B| = \left(1 - \frac{4 \cdot A \cdot B}{(A+B)^2}\right)^{1/2} \quad (5)$$

Figure 5:
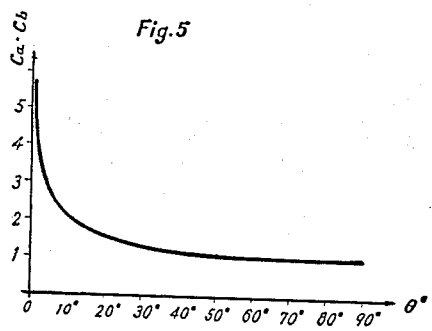
FIG. 5 shows the product of coefficients of ellipse (as the periphery of compressed area) as a function of ⑭.

$C_a \cdot C_b$ is shown in FIG. 5. The notation $|\ |$ means absolute value. The area inscribed in the ellipse which is expressed by Equation 3 is proportional to $C_a \cdot C_b / |A+B|^{2/3}$ as shown by Equations 4 and 5. Therefore, $C_a \cdot C_b$ should be increased and $A+B$ be decreased in order to enlarge said compressed area, provided that contact stress (maximum value) $P_o$ and gear materials ($E_1$, $E_2$; $\nu_1$, $\nu_2$) remain constant. Under these conditions contact strength attains a maximum value. This principle is expressed by the following expressions:

$$A \cdot B = 0 \text{ and } A+B \text{ should be minimized} \quad (6)$$

wherein $A \cdot B$ and $AB$ can be expressed by the parameters $R_1$, $R_2$, $\beta_1$, $\beta_2$, $\omega_1$, $\omega_2$, and $r$ for any type of meshings including internal and external meshings with fixed transmission ratios and with either parallel, intersecting, or crossing axes. $R_1$ and $R_2$ are the respective distances from the instantaneous axis to the respective axes along the shortest line which can be drawn therebetween; these distances are determined by the relative position of the axes. $\beta_1$ and $\beta_2$ are the angles formed by the instantaneous axis and each rotor axis and $\omega_1$, $\omega_2$, are the angular velocities of each rotor.

However in order to simplify the explanation, meshing of gears having parallel axes will be considered. Then the following equations are obtained with a given transmission ratio.

$$A \cdot B = \frac{\cot^2 \beta}{4(\cos^2 \alpha + \cot^2 \beta)^2} \cdot \left[ (1/R_1 - 1/R_2) \frac{(a_2-r)(a_1-r)}{a_1 \cdot a_2} \right.$$
$$\left. \{1/(a_2-r)z - 1/(a_1-r)\} \cdot \sin \alpha - (1/R_1 - 1R_2) \right] \quad (7)$$

wherein $\alpha$ is the pressure angle in the transverse plane, and
$\beta$ is the helix angle,
$S_1 = (\sin \alpha - r/R_1)^2 + \cos^2 \alpha + \cot^2 \beta$, and
$S_2 = (\sin \alpha - r/R_2)^2 + \cos^2 \alpha + \cot^2 \beta$ $$A + B = \frac{\cot \beta}{2(\cos^2 \alpha + \cot^2 \beta)^{3/2}} \left[ \frac{S_2}{a_2} - \frac{S_1}{a_1} \right.$$
$$\left. - (1/R_1 - 1/R_2)\{\sin \alpha - r(1/R_1 + 1/R_2)\} \right] \quad (8)$$

wherein $a_1$ and $a_2$ are the respective radii of curvature of each tooth profile in the section perpendicular to the instantaneous axis at a contact point.

Figure 2:
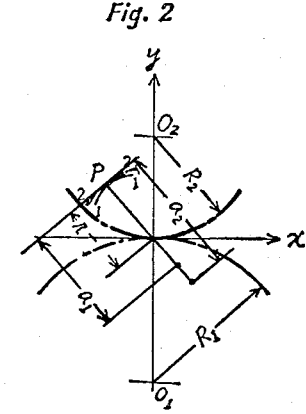
FIG. 2 shows geometrical meaning of parameters $a_1$, $a_2$, $r$, $R_1$ and $R_2$.

The geometric meaning of $a_1$, $a_2 \cdot R_1$, $R_2$, and $r$ is shown in FIG. 2. With respect to gears having parallel axes, $a_1$ and $a_2$ are the radii of curvature of the teeth profiles at a contact point. $R_1$ and $R_2$ are the diameters of pitch circles, and $r$ is the distance of a contact point from its pitch point.

Figure 3:
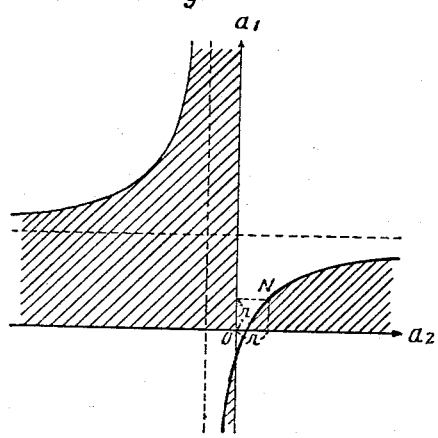
FIG. 3 shows available regions (shaded areas) in which any point whose coordinates are $a_1$ and $a_2$ can be regarded as a point for which a set of $a_1$ and $a_2$ will be able to serve as a pair of radii of curvature of two mating tooth surfaces in the transverse section to the axes without any local interferences.

FIG. 3 shows the available regions in which a set of $a_1$ and $a_2$ is found. The area where $a_1$ and $a_2$ have positive values is most important.

Figure 4:
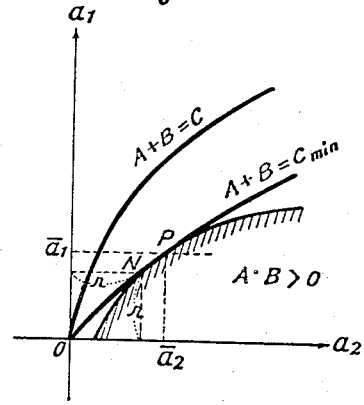
FIG. 4 shows formation of a point P whose coordinates $a_1$ and $a_2$ coincide with an optmium set of $a_1$ and $a_2$ ($\bar{a}_1$ and $\bar{a}_2$) at a contact point.

FIG. 4 shows a curve defining the available region represented by the inequality and equality of $A \cdot B \geqq 0$. This curve is shown to be a portion of a hyperbola passing through a point N whose coordinates are $a_1 = r$, $a_2 = r$. This figure also shows a set of $a_1$ and $a_2$ satisfying the condition that $A + B = C$ which is a portion of another hyperbola passing through the origin 0. C is a positive value because the relative curvature determines the direction of driving action as well as the kind of contact behavior at a contact point.

The relative curvature of the surfaces at a contact point in the section perpendicular to the instantaneous axis is expressed by $2(H_2 - H_1) = 2C$. For a point system of meshing of the helical type, it is necessary to transmit driving action from the driver to its cooperating member, the follower, and contact behavior will be determined by the sign of above parameter C, as well as the location of a contact point. With reference to FIG. 2, contact point P is located in the second quadron.

The nearer said curve $(A+B=C)$ approaches the $a_2$ axis, the smaller the value of C becomes. With reference to FIG. 5, it is obvious that there should exist the least possible positive value of C. From this fact, it is concluded that when the values of $\alpha$, $\beta$, $r$, $R_1$ and $R_2$ are given, the minimum positive value which C can take in the available region $(A \cdot B \geqq 0)$ can be obtained as the coordinates of a point at which two curves $(A \cdot B = 0)$, $(A+B=C)$ come into tangential contact. This point is marked by P; then an optimum set of $a_1$ and $a_2$ ($\bar{a}_1$ and $\bar{a}_2$) as the coordinates of said point P is obtained as follows:

$$\bar{a}_1 = \frac{(r^2/\sin \alpha)(1/R_1 - 1/R) \cdot S_1^{1/2}}{\{1 + (r/\sin \alpha)(1/R_1 - 1/R_2)\} S_1^{1/2} - S_2^{1/2}}$$

$$\bar{a}_2 = \frac{(r^2/\sin \alpha)(1/R_1 - 1/R_2) \cdot S_2^{1/2}}{S_1^{1/2} - \{1 + (r/\sin \alpha)(1/R_2)\} \cdot S_2^{1/2}} \quad (9)$$

wherein $S_1$ and $S_2$ are expressed by Equation 8.

Mathematical analysis of the Novikov-type and Wildhaber-type meshing systems show that they have $|H_2 - H_1|$ values greater than those provided by the meshing system of this invention.

Figure 6:
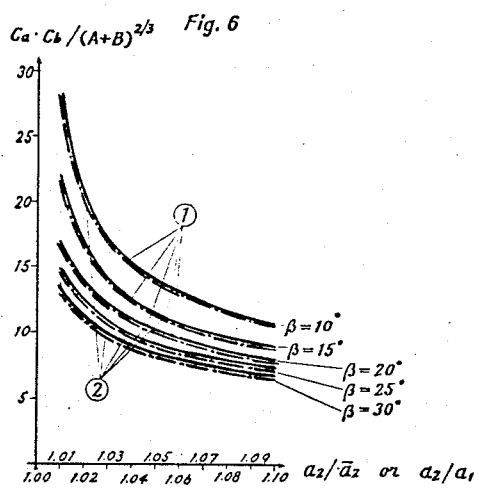
FIG. 6 shows contact strength (expressed indirectly by relative compressed area) as a function of radius of curvature of tooth surface 2 in the plane perpendicular to the instantaneous axis; wherein $a_2/\bar{a}_2$ is used for the gears of this invention (1) and $a_2/a_1$ (wherein $a_1 = r$) is used for Novikov-type gears (2).

FIG. 6 shows a comparison of the contact strength, expressed indirectly by relative compressed area, of the Novikov-type system and the meshing system of this invention. The system of this invention (1) is represented by the parameters $a_1/\bar{a}_2$, and the Novikov-type system (2) is represented by the parameters $a_1/a_2$, wherein $a_1 = r$. The other parameters had values as follows: $\beta = 30°$, $R_1 = 6,250$, and $R_2 = 5,000$.

The thickness of the teeth and their pitch are established in accordance with the necessary bending end shear stress, and the position of a contact point is determined in accordance with the balance between the values of contact strength and the necessary shear and bending stresses. The width of the rim of the gears or the length of the teeth must have a certain relation to their pitch so that a given period of contact is ensured during overlapping of two teeth.

Gear transmission can have single point meshing i.e. only one pair of teeth may operate (excluding the period of overlap); there can also be transmission of multi-point meshing when several pairs of teeth are working simultaneously.

In the case of gear transmissions with parallel axes, it is most suitable, starting from design and technological consideration, to choose a line of contact points, in the form of a straight line parallel to the gear axes, and to consider the velocity of the motion of the contact point constant; then the radii of the tooth profiles in all the planes perpendicular to the axes will be the same and the working surfaces of the teeth will be correct helical surfaces.

Figure 7:
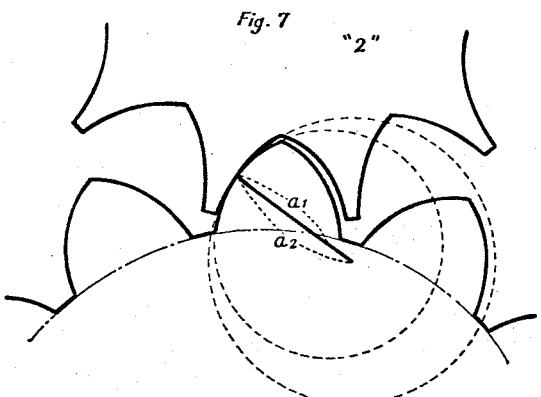
FIG. 7 shows a tooth profile of a gear transmission according to this invention.

FIG. 7 shows the respective pairs of radii of curvature of a Novikov-type gear transmission.

Figure 8:
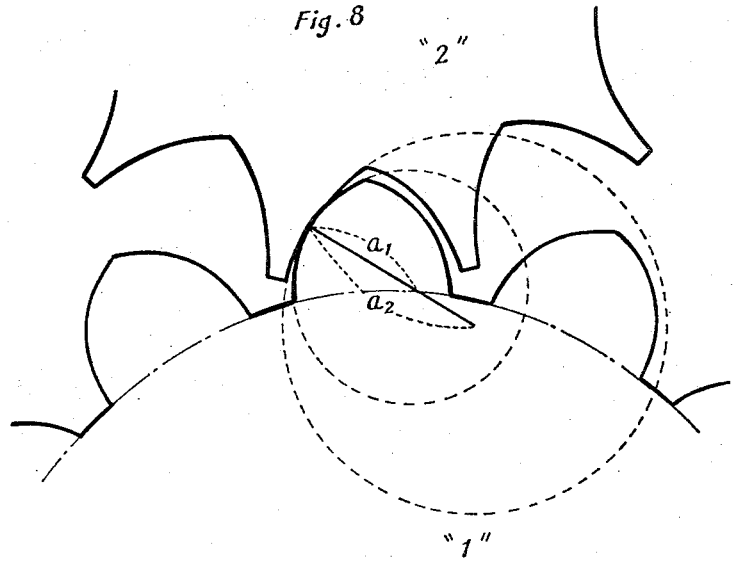
FIG. 8 shows the tooth profile of a Novikov-type gear for comparison with the profile shown in FIG. 3.

FIG. 8 shows the respective pairs of radii of curvature of a pair of mating gears having profiles according to this invention.

Figure 9:
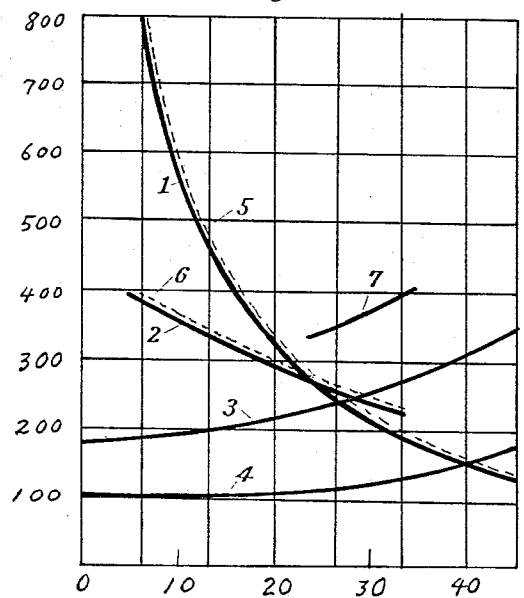
FIG. 9 shows a comparison of relative load capacity of the present type of transmission with the results reported in the International Conference on Gearings held at Essen, Germany, October 1960.

FIG. 9 shows a comparison of the relative load capacities of the transmission of this invention with the results reported in the International Conference on Gearing held at Essen, Germany, in October 1960. In this figure, the various systems are identified as follows:

(1) Novikov gears (calculated),
(2) German estimates of Soviet tests,
(3) Involute, 28-deg. (calculated),
(4) Involute, 20-deg. (calculated),
(5) The present gears (to be estimated theoretically),
(6) The present gears (to be estimated experimentally),
(7) V.B.B. gears (tests).

The foregoing description is directed solely towards the construction illustrated, but I desire it to be understood that I reserve the privilege of resorting to all the mechanical changes to which the device is susceptible, the invention being defined and limited only by the terms of the appended claim.

What is claimed is:

In a gear transmission, a pair of intermeshing gears having parallel axes, the respective gears having profiles in a plane passing through the current position of a contact point of the working surfaces and perpendicular to the instantaneous axis of movement of the working surfaces, said profiles being curves having a set of radii in said plane as expressed by the following equations:

$$\bar{a}_1 = \frac{(r^2/\sin \alpha)(1/R_1 - 1/R_2) \cdot S_1^{1/2}}{[1 + (r/\sin \alpha)(1/R_1 - 1/R_2)]S_1^{1/2} - S_2^{1/2}}$$

$$\bar{a}_2 = \frac{(r^2/\sin \alpha)(1/R_1 - 1/R_2) \cdot S_2^{1/2}}{S_1^{1/2} - [1 + (r/\sin \alpha)(1/R_1 - 1/R_2)]S_2^{1/2}}$$

wherein $$S_1 = (\sin \alpha - r/R_1)^2 + \cos^2 \alpha + \cot^2 \beta$$

$$S_2 = (\sin \alpha - r/R_2)^2 + \cos^2 \alpha + \cot^2 \beta$$

and wherein $\bar{a}_1$ and $\bar{a}_2$ are the respective radii, $\alpha$ is the pressure angle in the transverse section to the axis, $\beta$ is the helix angle, $r$ is the distance of a contact point from its pitch point, and $R_1$ and $R_1$ are the respective diameters of the pitch circles.

References Cited

UNITED STATES PATENTS 3,180,172  4/1965  Leggatt _____ 74—462

DONLEY J. STOCKING, *Primary Examiner.*

DAVID J. WILLIAMOWSKY, *Examiner.*

L. H. GERIN, *Assistant Examiner.*